Oct. 14, 1969     J. SILGAILIS     3,473,092
ELECTROLYTE CAPACITOR HAVING A SEEDED MANGANESE
OXIDE DIELECTRIC LAYER
Filed July 10, 1967     2 Sheets-Sheet 1

INVENTOR
JOHN SILGAILIS
BY
ATTORNEY

Oct. 14, 1969   J. SILGAILIS   3,473,092
ELECTROLYTE CAPACITOR HAVING A SEEDED MANGANESE
OXIDE DIELECTRIC LAYER
Filed July 10, 1967   2 Sheets-Sheet 2

INVENTOR
JOHN SILGAILIS
BY
Robert Levine
ATTORNEY

000
United States Patent Office 3,473,092
Patented Oct. 14, 1969

3,473,092
ELECTROLYTE CAPACITOR HAVING A SEEDED MANGANESE OXIDE DIELECTRIC LAYER
John Silgailis, Billerica, Mass., assignor to P. R. Mallory & Co., Inc., Indianapolis, Ind., a corporation of Delaware
Filed July 10, 1967, Ser. No. 652,057
Int. Cl. H01g 9/00; C09k 3/00
U.S. Cl. 317—230
12 Claims

ABSTRACT OF THE DISCLOSURE

A means and method of providing a dense, semiconductive layer of manganese dioxide overlying and in intimate contact with the dielectric oxide film formed on the anode of electrolyte capacitors.

---

The present invention relates to improved means and methods of fabricating solid electrolyte capacitors, and more particularly relates to a modified manganous nitrate solution and to an improved method of forming a dense, semiconductive layer of manganese dioxide film over the dielectric oxide film formed on the film-forming metal anode.

Generally, solid electrolyte capacitors are fabricated by pressing and sintering a film-forming metal such as tantalum, aluminum, niobium, titanium, zirconium, hafnium, and the like into a pellet having a multiplicity of intercommunicating voids. During the fabrication thereof, the pellet is subjected to anodization or electro-formation by passing a direct current from the pellet through an electrolyte in which the pellet is immersed to a vessel containing the electrolyte. The voltage applied to the anode ranges from about 10–300 volts depending on the thickness of the anodized film desired. The higher the voltage is used, the thicker the resulting film and the lower the resulting capacitance. The electrolyte solution may be an aqueous solution of sulfuric acid, nitric acid, phosphoric acid, and the like. The pellet is impregnated with a solution of manganous nitrate and heated in air at a sufficient temperature of about 200 to 400° C. to effect the pyrolytic conversion of the manganous nitrate covering the pellet and permeating the pores to a semiconductive solid electrolyte manganese dioxide. The anodization step and the pyrolytic conversion step may be repeated as many times as is necessary in order to obtain a pellet having the desired electrical characteristics. The manganese dioxide layer acts as the dry electrolyte for the capacitor. The cathode is prepared using conventional methods whereby an electrically conductive layer is applied over the manganese dioxide layer. Preferably, a graphite layer is applied to the oxidized anode before the cathode layer is applied. The capacitor is completed by attaching leads to the anode and to the cathode, and encapsulating the capacitor.

It is known in the art to convert manganous nitrate to a manganese dioxide coating on a solid film forming capacitor anode by pyrolysis. However, the pyrolytic conversion of manganous nitrate to manganese dioxide does not occur uniformly throughout the manganous nitrate overlying the dielectric oxide film but rather at sites of existing manganese dioxide particles. Since during the initial phase of pyrolytic conversion of the manganous nitrate to manganese dioxide nuclei do not exist, the pyrolysis of the first manganese dioxide layer proceeds somewhat differently than subsequent steps wherein the manganous nitrate is converted to manganese dioxide. It has been found that manganese dioxide nuclei form only after some portion of the manganous nitrate has attained a temperature of 180° C. or above. It was found that nuclei of manganese dioxide are formed in the manganous nitrate solution which is in the closest proximity to the source of heat, that is, the exposed exterior surface of the manganous nitrate overlying the dielectric film. Thus, it is seen that pyrolytic conversion of the manganous nitrate to manganese dioxide proceeds from the exposed surface of the solution inwardly toward the dielectric oxide film. The manganous nitrate at the interface is, therefore, converted last. As a result of the order of conversion, the manganese dioxide at the interface is spongy due to the gases released by the manganous nitrate during conversion thereof thereby leaving areas of the dielectric oxide film which are not contacted by manganese dioxide.

Another cause for the spongy initial coating of manganese dioxide present in dry electrolytic capacitors is that due to the high rate of air exchange in ovens necessary to remove the corrosive by-products evolved therein during the pyrolytic conversion of manganous nitrate to manganese dioxide. The high rate of air exchange permits the manganous nitrate solution to dehydrate thereby crystallizing into a brittle salt which is only partially in contact with the dielectric oxide film. The manganous nitrate crystals are pyrolyzed without substantial alterations in shape thereby resulting in an initial manganese dioxide layer which is fluffy and brittle and in partial contact with the dielectric oxide film. Thus, it is seen that the dielectric oxide film includes areas which are not completely covered by and/or in intimate contact with the initial layer of manganese dioxide. Repeating the pyrolytic conversion steps several more times fills some of the uncovered dielectric oxide film areas, however, some of the uncovered areas still persist. Thus, it is seen that the combination of the initial manganese dioxide layer and subsequent manganese dioxide layers do not cover the oxide film dielectric formed on the anode in toto.

It has been found that capacitors fabricated from a film-forming metal such as tantalum, and in particular, tantalum capacitors having a low voltage rating and a high capacitance rating undergo deleterious changes in electrical characteristics with a changing in humidity of the ambient air. For example, if the humidity of the ambient air increases from an initial humidity, the capacitance and the dissipation factor increase and when the humidity decreases to about the initial value, the capacitance and dissipation factor of the capacitor decrease to substantially their original values. The cause for variation in the electrical properties of a film forming anode capacitor is not positively known, however, it is thought that the variation of the electrical characteristics is related to the areas of the dielectric oxide film not covered by the manganese dioxide. In such a situation, the capacitor is not utilizing the entire potential capacitance thereof. Therefore, it is thought that when the moisture content of the ambient air is increased and when the moisture comes in contact with the uncovered surface of the anode and/or permeates the intercommunicating voids of the anode, sufficient electrolyte-like material is formed as a result of combining with carbon dioxide in the air or ionizable material in the anode such as in the semiconductive layer of manganese dioxide so as to cover these areas of the tantalum oxide film which are not covered by the manganese dioxide electrolyte thus causing the newly covered areas to exhibit capacitance not exhibited heretofore. It is thought, therefore, that the additional capacitance found under the newly formed electrolyte-like material causes the increase in the capacitance of the capacitor. In addition, it is thought that the newly formed electrolyte-like material has a high resistivity which causes the capacitor to exhibit an increase in the dissipation factor.

Attempts have been made to overcome the above problems by encapsulating the capacitor within a hermetic enclosure to thereby control the humidity of the ambient air surrounding the anode. Hermetic sealing does assist in stabilizing the electrical properties of the capacitor, however, the inner walls of the hermetic closure and the anode itself carry a film of water which is released as water vapor when the capacitor is subjected to operating temperature in excess of 100° C. to thereby affect the electrical characteristics of the capacitor. In addition, true hermetic seals are difficult to obtain thereby resulting in seals that have minute pin holes therein which allow a slow but harmful exchange of the ambient air contained within the enclosure with the air of the surrounding environment. Thus, it is seen that although hermetic enclosures enjoy a measure of success, the hermetic enclosure approach does not attempt to overcome that which is thought to be one of the reasons why dry electrolytic capacitors are sensitive to changes in the moisture content of the ambient air.

The aforementioned problems are overcome by the present invention by providing a modified manganous nitrate solution consisting essentially of colloidal mangaese hydroxide suspended in an acidic manganous nitrate solution. The colloidal manganese hydroxide precipitates therefrom at about 110°–130° C. and clings to the dielectric film to thereby provide uniformly dispersed nucleation sites in direct and intimate contact with the dielectric oxide film. The nucleation sites concentrate the pyrolytic conversion at the interface between the solution and the oxide film rather than at the exterior surface of the solution. In addition, the present invention provides a means and method of restricting the drying rate of the modified manganous nitrate solutions yet provides a rapid heating rate thus substantially preventing formation of a crystalline phase in the modified manganous nitrate solution. A solid, dense initial manganese dioxide layer is formed on dielectric oxide film which is not undercut or uplifted because pyrolysis is initiated at the interface between the dielectric oxide and the modified manganous nitrate solution and not at the exterior surface of the modified manganous nitrate solution and because no gases are evolved between the manganous nitrate solution and the solid manganese dioxide.

Therefore, it is an object of the present invention to provide a capacitor having a porous anode of film-forming material which has a dense semiconductive layer of manganese dioxide overlying and in intimate contact with substantially all of the dielectric oxide film formed on the anode thereof.

Another object of the present invention is to provide a method of pyrolyzing manganous nitrate so that the resulting manganese dioxide film is in intimate contact with substantially all of the dielectric oxide film thereby further stabilizing the electrical properties of the film-forming metal capacitor.

A further object of the present invention is to provide a modified acidic manganous nitrate solution including colloidal manganese hydroxide seeds which is pyrolytically converted in situ to provide a dense semiconductive layer of manganese dioxide overlying the dielectric oxide film formed on the anode of the capacitor.

Yet another object of the present invention is to provide a modified manganous nitrate solution including seeds which does not crystallize into a brittle salt upon heating thereof.

Yet still another object of the present invention is to provide a film-forming metal capacitor wherein manganous nitrate solution having colloidal suspension of manganese hydroxide seeds uniformly dispersed therethrough which precipitate at about 110–130° C. and cling to the dielectric oxide film so as to provide nucleation sites at the interface between the modified solution and the dielectric oxide film.

A further object of the present invention is to provide a solid electrolyte capacitor having increased capacitance and reduced dissipation factor.

Yet another object of the present invention is to provide a solid electrolyte capacitor having a dense layer of manganese dioxide overlying the dielectric oxide film.

A further object of the present invention is to provide a solid electrolyte capacitor wherein a modified manganous nitrate solution over the dielectric oxide film is pyrolytically converted in situ beginning with the portion of the solution at the interface between the dielectric oxide film and the solution and ending with the exposed surfaces of the modified manganous nitrate solution.

Yet another object of the present invention is to provide an improved means and method for pyrolytically converting in situ a modified manganous nitrate solution overlying a dielectric oxide film.

A further object of the present invention is to provide a solid electrolyte capacitor which is simple in construction, has more stable electrical characteristics and is economical to manufacture.

The present invention in another of its aspects relates to the novel features of the instrumentalities of the invention described herein for teaching the principal object of the invention and to the novel principles employed in the instrumentalities whether or not these principles may be used in the said object and/or in the said field.

With the aforementioned objects enumerated, other objects will be apparent to those persons possessing ordinary skill in the art. Other objects will appear in the following description, appended claims and appended drawings. The invention resides in the novel construction, combination, arrangement, and cooperation of elements as hereinafter described and more particularly as defined in the appended claims.

The appended drawings illustrate embodiments of the present invention constructed to function in the most advantageous mode devised for the practical application of the basic principles in the hereinafter described invention.

Generally speaking, the present invention relates to means and method for fabricating an electrolyte capacitor having an anode of film-forming metal, an anodized dielectric film formed on the surface of the anode and a solid, dense manganese dioxide electrolyte layer overlying the film. The electrolyte layer is the pyrolytic conversion product of a modified manganous nitrate solution containing colloidal seeds of a manganese compound. The colloidal seeds are precipitated therefrom upon the application of an elevated temperature which is less than the pyrolytic conversion temperature. The colloidal seeds and the manganous nitrate are converted in situ to manganese dioxide upon the application of the pyrolytic conversion temperature thereto. The application of heat to the modified solution is such to provide a rapid heating rate while restricting the drying rate of the modified solution.

Figure 1:
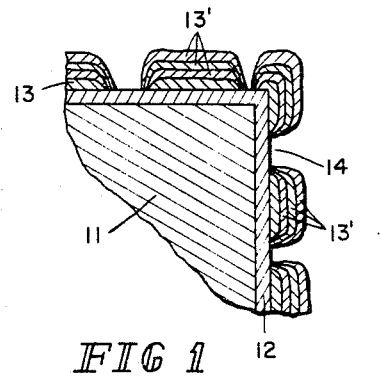
FIGURE 1 is an enlarged partial cross-sectional view of a solid electrolytic capacitor illustrating the areas in the semiconductive manganese dioxide layer not overlying the dielectric oxide film. Aspects of the view have been disproportionally illustrated in order to more clearly show the areas not covered by the semiconductive layer.
Figure 3:
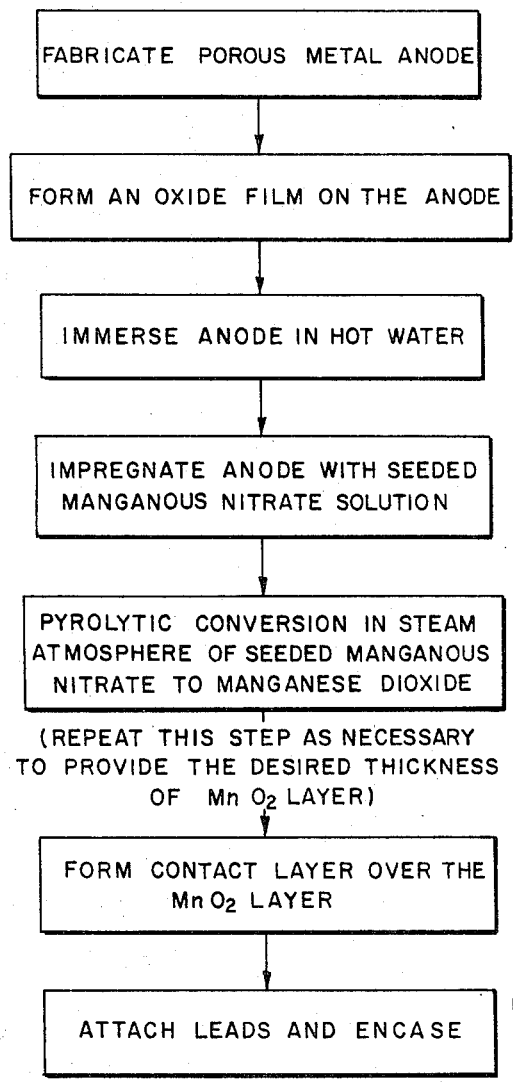
FIGURE 3 is a diagrammatic illustration of the method of the present invention.

Referring now to the enlarged partial cross-sectional view illustrated in FIGURE 1 of the drawing, an anode of film-forming metal of the capacitor is indicated by the reference numeral 11. The various layers covering the anode are shown disproportionately enlarged with respect to one another in order to more fully illustrate the problems which the present invention overcomes. The anode 11 is sintered, porous-pressed powder metal anode or pellet 11 selected from the group of film-forming or anodizable metals selected from the group consisting of tantalum, aluminum, niobium and the like. The porous pellet includes a multiplicity of intercommunicating voids (not shown). During fabrication thereof, the pellet is subjected to electro-formation by passing a suitable direct current from the pellet through an electrolyte and which the pellet is immersed to a tank containing the electrolyte.

The anodized pellet 11 was immersed in an unmodified manganous nitrate solution and heated in air for a sufficient length of time to effect the pyrolytic conversion of the unmodified manganous nitrate covering the pellet and permeating the pores thereof to manganese dioxide 13. It is seen that the dielectric oxide film 12 is not completely covered by the manganese dioxide layer 13 as shown in FIGURE 1 due to the pyrolytic conversion initiated at the exterior surface of the solution rather than at the interface between the solution and the dielectric oxide film, due to the effect of escaping gases during the pyrolytic conversion of a manganous nitrate and due to the crystallization of the manganous nitrate which occurs prior to the initiation of the pyrolytic conversion of manganous nitrate. Subsequent immersions of the anode into a manganous nitrate solution results in partial covering of the uncovered areas of dielectric oxide film with the semi-conductive manganese dioxide. However, the covering is incomplete thereby leaving exposed dielectric oxide film areas as shown at 14. It is thought that when the incompletely covered dielectric oxide film is subjected to an increased humidity, an electrolyte-like material is formed which causes the capacitor to exhibit capacitance not heretofore exhibited thereby causing the capacitance of the capacitor to vary.

Figure 2:
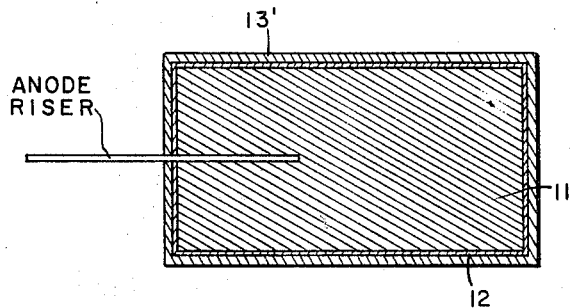
FIGURE 2 is an enlarged cross-sectional view of a solid electrolytic capacitor illustrating a dense semiconductive layer of manganese dioxide overlying and in intimate contact with the dielectric oxide film formed on the anode of a solid electrolytic capacitor.

By using a modified nitrate solution, a dense semiconductive manganese dioxide layer 13' is formed overlying and in intimate contact with the dielectric oxide film 12 formed on the anode 11 as illustrated in FIGURE 2. The modified manganous nitrate solution consists essentially of an acidic manganous nitrate solution having suspended therein colloidal of a manganese compound such as manganese hydroxide. The colloidal manganese hydroxide is formed by adding either ammonium hydroxide or powdered manganese metal to an acidic manganous nitrate solution. The ammonium hydroxide ($NH_4OH$) is added to the manganous nitrate ($Mn(NO_3)_2$) solution until a visible precipitate is formed. The actual quantity is approximately 0.5% by volume of 30% ammonium hydroxide added to 40% manganous nitrate solution. Most of the ammonia, however, goes to neutralize the excess nitric acid in the as received manganous nitrate solution (0.01–0.5% b.w.) and only a very minute amount actually serves to produce the seeds. The solution is not capable of holding the seed producing substances (hydroxides) in any great concentrations and the excess precipitates. Since the seed forming substances are soluble in nitric acid, they form only after the nitric acid has been neutralized. At this point the solution turns slightly cloudy and the pH begins to rise (~0.5). If the hydroxide concentration is increased (pH ~3.5), lumps of insoluble $Mn(OH)_2$ are formed. Such lumps clog the pores in the anode and also form hot spots during the pyrolysis, therefore, should be avoided and if formed, should be permitted to settle out.

When manganese metal is added to the manganous nitrate solution, it reacts with the free nitric acid and water and the final result is the same as with the ammonium hydroxide. The actual reactions are:

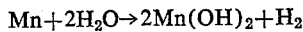

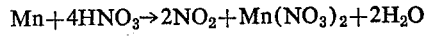

It is thought that the use of other manganese compounds would contaminate the solution. Note that the modification as described does not introduce any elements that are not already present in the solution (H, O, N, Mn).

The colloidal manganese hydroxide is precipitated from the solution as manganese hydroxide seeds upon the application of heat in the range of about 110°–130° C. in a steam atmosphere. Continued application of heat causes, it is thought, conversion of the manganese hydroxide to MnOOH which upon further application of heat thereto forms manganese dioxide nucleation sites which are uniformly dispersed over the entire surface of the anode at the interface between the modified solution and the dielectric oxide film. The manganese dioxide nucleation sites serve as sites for the formation of manganese dioxide layer. Thus, it is seen that pyrolytic conversion of the modified manganous nitrate solution is initiated at the surface of the dielectric oxide film rather than at the exterior surface of the modified manganous nitrate covering the anode. The improved manganese dioxide layer 13' appears to resemble a dense vapor plated coat which substantially completely covers the dielectric oxide film and is in intimate contact therewith.

Figure 4:
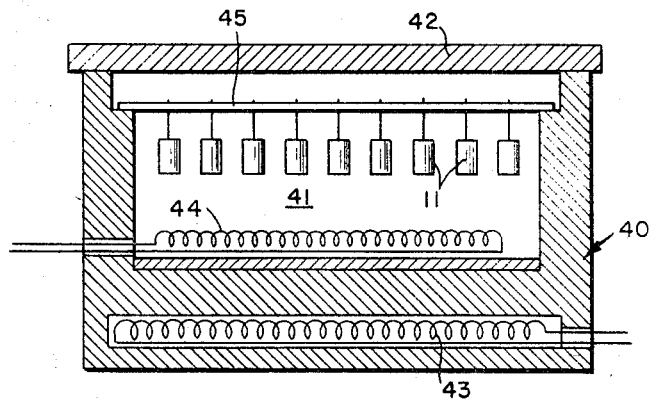
FIGURE 4 shows heated cavity which provides rapid heating of the modified manganous nitrate solution and minimizes the drying rate.

FIGURE 4 shows an oven 40 having a heated cavity 41 in which are suspended by means of means 45 a plurality of anodes 11. The anodically formed anodes are thoroughly washed in hot, deionized water and immersed wet into the modified manganous nitrate solution and permitted to soak for about 5–30 minutes. The optimum soak time and specific gravity of the solution depend upon the size and the density of the anodes. A typical soak cycle is about 15 minutes in a 1.38 specific gravity solution. The oven includes a displaceable top 42 which is used to close the cavity 41 thereby preventing the wet or hot steam atmosphere from escaping from the cavity. The oven includes a plurality of heating coils 43 and 44. As indicated in FIGURE 4, the heating coil 43 is used to heat the mass of the oven so as to maintain the temperature within the cavity at a predetermined level of about 250°–350° C. The radiant heater 44 is located within the cavity and is used to apply large quantities of heat directly to the anodes 11. The purpose of heater 44 is to provide rapid heating of the modified manganous nitrate solution. The manganous nitrate solution begins to boil at approximately 108° C., and as it loses water the boiling temperature increases until at approximately 150° C. only a dry crystalline salt remains. Since the salt crystallizes to a very fluffy snowflake structure, this state must be prevented. Rapid heating introduces a temperature gradient into the anode and the salt solution. The cooler parts serve as sources of water to keep the hotter parts wet. The desired conditions are somewhat similar to electroless silvering where particles have to precipitate from a liquid if a dense, adhesive coating is to be obtained. The seeds do not prevent crystallization, they only serve as centers from which the $MnO_2$ grows. The preferred heating rate should be such that precipitation has occurred and pyrolytic conversion is initiated in about 15–50 seconds after the application of heat thereto. However, the temperature at the interface between the modified manganous nitrate solution and the dielectric oxide film should not exceed 350° C. since the dielectric oxide film may be damaged by temperatures in excess of 350° C. The radiant heater 44 is energized for 30–60 seconds to insure that modified manganous nitrate solution attains at least 180° C. at the interface between the modified solution and the dielectric oxide film to cause precipitation of the colloidal manganese hydroxide and initiate pyrolysis thereof. The radiant heater may be de-energized at any time after the pyrolysis begins (visible emission of brown $NO_2$ gas) and before it goes to completion, without affecting the terminal temperature of the anodes, because the reaction is endothermic and takes place at a nearly constant temperature (180° C.). After the pyrolysis is complete, the radiant energy is used up by increases in temperature of the surroundings. When the radiant heater 44 is de-energized, the heater 43 continues to maintain the temperature within the cavity 41 at about 250–350° C. so as to maintain continuous pyrolysis of the modified manganous nitrate solution. Pyrolysis is maintained by heater 43 for about 3–10 minutes so as to insure that a dense layer of manganese dioxide is overlying the dielectric oxide film.

The atmosphere contained within cavity 41 is a preheated wet atmosphere such as a hot steam atmosphere which is heated to about 250–350° C. The steam atmosphere is utilized to minimize any tendency of the modified manganous nitrate solution to crystallize as a brittle salt thereby minimizing the drying rate of the modified solution.

Figure 5:
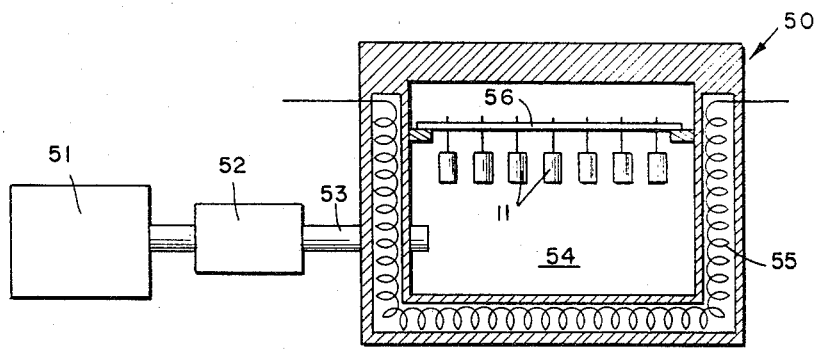
FIGURE 5 illustrates a heated cavity into which preheated steam is introduced.

FIGURE 5 shows a modified pyrolysis oven 50 including a steam generator 51, a preheater unit 52 and conduit means 53 connecting the steam generator through the preheater unit to the cavity 54 contained within the pyrolysis oven. The pyrolysis oven 50 includes heater unit 55 retained in the side walls of the oven as with the oven shown in FIGURE 5. A plurality of anodes 11 are suspended within the cavity 54 by use of means 56. The object of the oven 50 is to provide rapid heating of the modified manganous solution and to minimize the drying rate. The oven 50 is designed such that preheated steam is introduced into cavity 54 by means of conduit 53. The heating rate of the oven 50 is such that pyrolysis of the modified solution is initiated after about 15–50 seconds, however, the temperature of the cavity does not exceed 350° C.

The present invention is not intended to be limited to the disclosure herein and changes and modifications may be made in the disclosure by those skilled in the art without departing from the spirit and the scope of the novel concepts of this invention. Such modifications and variations are considered to be within the purview and scope of this invention and appended claims.

Having thus described my invention, I claim:

1. In an electrolytic capacitor having an anode of film-forming metal, an anodized dielectric oxide film on the surface of said anode, a dense manganese dioxide electrolyte layer overlying said film, and a conductive cathode contact layer over the electrolyte layer, said electrolyte layer being a pyrolytic conversion product of a solution of manganous nitrate containing colloidal particles of manganese compound convertible to seed particles of manganese dioxide at a temperature below the conversion temperature of the manganous nitrate, and the electrolyte layer consisting essentially of the conversion product of said colloidal particles and manganous nitrate in situ converted, at temperatures within the range of approximately 110–350° C.

2. In an electrolyte capacitor having an anode of film-forming metal as claimed in claim 1, wherein said colloidal seeds consist essentially of manganese hydroxide.

3. In an electrolyte capacitor having an anode of film-forming metal as claimed in claim 1, wherein said pyrolytic conversion takes place in a water vapor containing atmosphere.

4. In an electrolyte capacitor having an anode of film-forming metal as claimed in claim 1, wherein said film-forming metal is selected from the group consisting of tantalum, aluminum, niobium, titanium, zirconium and hafnium.

5. In an electrolyte capacitor having an anode of film-forming metal as claimed in claim 1, wherein said pyrolytic conversion is initiated at the interface between said modified manganous nitrate solution and said dielectric oxide formed on the surface of said anode.

6. In an electrolyte capacitor having an anode of film-forming metal as claimed in claim 3, wherein said water vapor containing atmosphere is a hot steam atmosphere having a temperature of about 250°–350° C.

7. In an electrolyte capacitor having an anode of film-forming metal as claimed in claim 1, wherein said colloidal seeds are precipitated onto said dielectric film at a temperature of about 110°–130° C. and wherein said colloidal seeds and said manganous nitrate are converted in situ to said manganese dioxide at a temperature of about 180°–350° C.

8. In an electrolyte capacitor having an anode of film-forming metal as claimed in claim 1, wherein said temperature below the conversion temperature of manganous nitrate is a temperature of about 110°–130° C.

9. In a method for making a solid electrolyte capacitor including the steps of anodically forming a dielectric oxide film on the surface of a film-forming metal anode, covering the surface of said dielectric oxide film with a solution of a material pyrolytically convertible to manganese semiconductive oxide, heating said anode to a temperature for pyrolytically converting in situ the material of said solution to a layer of dense semiconductive oxide material overlying said dielectric film and applying a counterelectrode of electrically conductive material on the surface of the semiconductive oxide layer, the improvement comprising: in the step of covering the surface of said dielectric oxide film, the solution consists essentially of an acidic manganous nitrate solution containing colloidal particles of a manganese compound pyrolytically convertible to manganese semiconductive oxide at a temperature below the pyrolytic conversion temperature of said manganous nitrate.

10. In a method for making a solid electrolyte capacitor as claimed in claim 9, including subjecting said modified solution to a temperature of about 110° C. or higher to precipitate said colloidal seeds onto said dielectric oxide film and raising said temperature to about 180° C. or higher to convert said colloidal seeds and said manganous nitrate to said semiconductive oxide layer.

11. In a method for making a solid electrolyte capacitor as claimed in claim 10, wherein said precipitation and said conversion takes place in a hot steam atmosphere having a temperature of about 250°–350° C.

12. In a method for making a solid electrolyte capacitor as claimed in claim 11, wherein said precipitation and initial pyrolytic conversion are accomplished by applying radiant heat for about 15–60 seconds whereon said application of radiant heat is terminated thereby providing a rapid heating rate while restricting the drying rate of said modified solution.

References Cited

UNITED STATES PATENTS

| 3,054,029 | 9/1962 | Wagner | 317—230 |
| 3,302,074 | 1/1967 | Black | 317—230 |

JAMES D. KALLAM, Primary Examiner

U.S. Cl. X.R.

29—570; 252—182